Patented Aug. 15, 1939

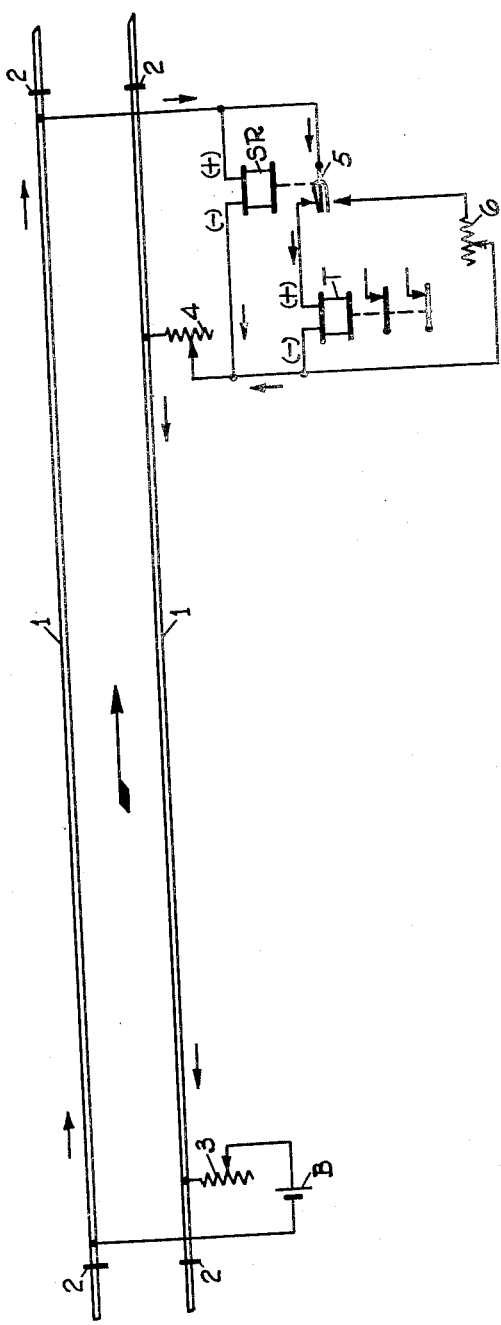

2,169,285

UNITED STATES PATENT OFFICE 2,169,285

TRACK CIRCUIT FOR RAILROADS

Neil D. Preston and Oscar S. Field, Rochester, N. Y., assignors to General Railway Signal Company, Rochester, N. Y.

Application May 21, 1936, Serial No. 81,056

6 Claims. (Cl. 246—41)

This invention relates to track circuits for railroads and more particularly to an improvement in the relay or electroresponsive device connected to the track rails and responding to the shunting of the track circuit.

In the usual and well-known track circuit, it is common practice to employ a fixed adjustment of the limiting resistance at the feed end of the track circuit, and the current through the track relay varies materially with change in the ballast resistance in wet and dry weather, and thus interferes with the proper and uniform shunting of the ordinary type of track relay. The ballast resistance changes slowly as the ballast accumulates moisture or dries out. A wheel shunt, however, is suddenly applied or removed as a car or train enters and leaves the track circuit.

Generally speaking, and without attempting to define the nature and scope of the invention, it is proposed to provide an auxiliary or secondary relay connected in multiple with the usual track relay and opening and closing the circuit for said track relay, said secondary relay having such proportion of parts and operating characteristics that it will be quickly de-energized by the opposing inductive impulse voltage applied to its winding by the decay of magnetic flux through the primary track relay upon application of a wheel shunt. During change of ballast resistance, however, the current through the primary track relay changes slowly, and there is no substantial impulse voltage generated by it to de-energize the secondary relay. In such an organization, the higher the ballast resistance, the greater the current through the primary track relay and the greater the energy stored in its magnetic circuit, and also the greater the resistance of the discharge path for such energy in multiple with the secondary relay, so that the organization as a whole automatically compensates in a sense for variations in ballast resistance which would otherwise affect the regular shunting of the track relay.

Various characteristic features, attributes, and advantages of the invention will be in part apparent, and in part pointed out as the description progresses.

The accompanying drawing illustrates in a simplified and diagrammatic manner one specific embodiment of the invention.

It is contemplated that the track rails 1 will be bonded together, with insulated joints 2 to define the ends of a track circuit section in accordance with the usual practice. At one end of the track section, preferably the entering end, with this invention, a track battery B, or equivalent source of current, is connected across the track rails 1 in series with a limiting resistance 3 in the usual way. At the other end of the track section a track relay T of the usual type and construction is connected across the track rails 1, preferably in series with an adjustable non-inductive resistance 4, and including a front contact 5 of an auxiliary or secondary relay SR, which is connected in multiple with the primary track relay T, as will be obvious from the drawing. The contact 5 of the relay SR is preferably provided with a make-before-break back contact which closes an auxiliary circuit through an adjustable resistance 6 in multiple with said relay SR. These electrical connections are obvious from the drawing.

In accordance with this invention, the primary track relay T is of the usual type and construction now in common use on railroads, comprising a pivoted armature, two cores and a back yolk of silicon steel or the like having low magnetic reluctance, the coils or windings on the cores having a number of turns sufficient to provide a relatively low flux density through the cores and armature with a small current excitation characteristic of the ordinary track circuit. A track relay of this type is disclosed, for example, in the patent to O. S. Field No. 1,824,129, September 22, 1931.

The secondary relay SR is preferably of the same general tractive armature type, but with much less iron in its magnetic circuit, although any similar electro-magnetic structure may be employed, the essential characteristics of the secondary relay being that it shall have a small amount of stored magnetic energy when energized, as compared with the primary track relay, and will generate a smaller voltage in response to the same rate of change of energizing current. Since this secondary relay SR operates only one contact 5, it can be readily designed and constructed so as to require less input energy than the primary track relay, and to have the other operating characteristics to carry out this invention. The secondary relay SR is also preferably constructed with a light armature, so as to be quick-acting, and to respond to a flux change of relatively short duration. For the simple arrangement illustrated, the secondary relay SR preferably has a resistance substantially the same as that of the primary track relay. If desired, the relay SR may be polarized, with its armature biased to a de-energized position.

Considering the contemplated operation, under normal conditions, when the track circuit is not occupied the interrail potential energizes the secondary relay SR to close its contact 5 and in turn to energize the primary track relay T to close its contacts to control circuit for signals, or for any other purpose for which a track relay may be used. As the ballast resistance changes in wet and dry weather, the currents through the primary and secondary relays change accordingly; and the voltage of the track battery B and the limiting resistance 2 are so chosen or adjusted that under the most unfavorable wet ballast conditions, there is sufficient inter-rail voltage at the relay end to produce operating currents for both relays and maintain their front contacts closed. This change in ballast resistance is very gradual, being due principally to the change in the moisture content in the ballast; and such gradual change in current in the relays does not induce any appreciable voltage at their terminals and cause any inter-change of energy.

When a car or train enters the track circuit, however, the wheel shunt is suddenly applied, much the same as in closing a switch; and this sudden application of the wheel shunt causes a quick reduction in the inter-rail potential and the voltage impressed across the terminals of the primary and secondary relays. Such reduction of impressed voltage is followed by a reduction in current, which, in accordance with well-known principles, creates a voltage of self-induction in the coils of each of the relays, in a direction, in each case, tending to maintain the flow of current. For example, assuming the normal direction of current flow to be indicated by the heavy arrows, the terminals of the relays are plus and minus as indicated. The self-induction of the relays tend to maintain this same polarity; but, in accordance with this invention, the magnetic energy stored in the primary track relay T being much greater than that in the secondary relay SR, the induced voltage pulse of self-induction created by the primary track relay is the greater and tends to oppose and over-power the voltage across the secondary relay.

It is found that a relay of the usual type and construction used in practice provides a sufficient voltage of self-induction upon application of the wheel shunt to de-energize a smaller relay of a similar type; and under some conditions the direction of current through the relay SR is actually reversed. This action is attributed to the phenomena above explained; but it should be understood that this is merely a discussion of a theory of operation, which is subject to qualification and depends upon other contributing factors under various conditions.

The de-energization of the secondary relay SR by the application of the wheel shunt opens its contact 5 to de-energize the primary track relay T, thereby assuring positive operation of the track relay in response to a wheel shunt. In other words, the energizing circuit for the primary track relay T is completely opened to de-energize it by the operation of the secondary relay SR in response to an impulse action characteristic of a wheel shunt, and not true of change in ballast resistance. This operation is quite distinctive from the ordinary reduction in current through a track relay by a wheel shunt, which produces an effect of the same nature as ballast resistance changes, but different in degree.

The voltage generated or created by the primary relay upon a reduction of its energizing current, which may be conveniently considered as the voltage of self-induction, has a discharge path to the rails and through the wheel shunt in multiple with the secondary relay SR; and it is apparent that the higher the resistance of this wheel shunt discharge path, the more effective the induced voltage pulse of self-induction is to decrease the current through the secondary relay SR. For this reason, an external adjustable resistance 4 is preferably employed between the track rails and the relays for ordinary operating conditions. Also, it is advantageous to have the battery at the entering end of the track circuit, rather than at the relay and in accordance with the usual practice, so that this discharge path includes the linear resistance of the track rails, although of course this is optional.

The organization of the invention automatically compensates for the variations in ballast resistance. If the ballast resistance is high, the over energization of the track relay, which reduces its sensitivity to respond to the ordinary shunting effect of the train, is counter-balanced by the high resistance of the wheel shunt discharge path for the voltage impulse of self-induction generated by the track relay, and hence a greater reduction in the energizing current for the secondary relay SR. If the ballast resistance is low, the energizing current for the track relay T more nearly corresponds to its normal operating or drop-away current, and this relay is thus in a condition to respond to such reduction in its energizing current as would be caused by the wheel shunt of relatively high resistance. Likewise, the secondary relay SR is weakly energized, and is effectively de-energized by a smaller reduction in its impressed voltage, which occurs even though the resistance of the discharge path for the voltage impulse of induction in multiple with the secondary relay SR is relatively low. A further compensating factor is that the track relay is more strongly energized, and has more magnetic energy stored in its magnetic circuit, when the ballast resistance is high; and the wheel shunt causes a voltage impulse of self-induction sufficient to de-energize effectively the secondary relay SR, notwithstanding its greater energizing current under the high resistance ballast conditions. In this connection, the secondary relay may be built to have its iron circuit substantially saturated at normal operating currents, so that there will be little additional magnetic energy stored in it for the larger energizing currents under high ballast resistance conditions. Thus, this invention provides an organization in which there is a kind of automatic compensation for variations in ballast resistance, as well as operation of the track relay by an impulse action.

In the particular arrangement shown, when the secondary relay SR releases its armature and opens the energizing circuit for the primary track relay T, the total resistance across the track rails at the relay end is increased, the two relays in multiple providing a combined resistance lower than either relay alone; and this may tend to reduce somewhat the total current from the battery through the limiting resistance and increase the inter-rail voltage. The secondary relay is preferably designed to require a relatively large current to pick up its armature, as compared with that needed to hold the armature in its attracted position. This assures that the secondary relay SR will remain effectively de-energized by the wheel shunt, until the wheel shunt is removed and the relay SR is sufficiently energized by the relatively high inter-rail potential existing when only one relay SR is being supplied with current from the track battery. When the relay SR picks up and connects the primary track relay T into the circuit, the total resistance across the track rails at the relay end is reduced, and more current flows from the battery B through the limiting resistance 3 to reduce the inter-rail potential. The secondary relay SR is so constructed that it will retain its armature in its attracted position under these conditions, and the primary track relay T is likewise so constructed that it will pick up and hold under such reduced inter-rail potential. These, and other factors, or conditions, affecting and determining the operating characteristics of the relays for satisfactory performance in accordance with this invention will be apparent to those skilled in the art once the underlying principles and mode of operation of the invention are understood.

The auxiliary circuit including the resistance 6, which is automatically closed when the relay SR drops, is also preferably employed to assure that the secondary relay SR is maintained de-energized. This resistance 6 may correspond with that of the track relay T, so that the total resistance across the track rails is substantially the same whether the secondary relay SR is energized or de-energized; or this resistance 6 may be somewhat lower than that of the track relay T to assure maintained de-energization of the relay SR under a wheel shunt, with due regard to the ratio of the pick-up and drop-away currents for the secondary relay SR. The make-before-break front and back contacts 5 of the secondary relay SR serve to provide for including and excluding the track relay T from the circuit connections without varying the total resistance across the track rails to interfere with the proper operation of the relays; and the provision of the auxiliary circuit and resistance 6 facilitates advantageous selection of the operating characteristics for the relays. If this auxiliary circuit through the resistance 6 should not be established for any reason, any resultant tendency of the secondary relay SR to pick up will be on the side of safety, since it would at once drop as soon as the track relay T had been cut in; and the consequent up-and-down pumping action of the relays would show an abnormal condition, and would fail to give the sustained closure of contacts characteristic of the normal unoccupied condition of the track circuit.

The invention is organized in accordance with the so-called normally closed circuit principle of failure on the side of safety. The breaking of connecting wires, or a break down in the coils of the relays, results in the opening of the contacts of the primary track relay T to put signals to stop, or to control other devices on the side of safety. In other words, the circuit connections of the organization are self-checking, and failures are self-betrayed, as will be apparent without further explanation.

Another feature of the organization of the invention is that the normal shunting operation of a track relay, characteristic of the ordinary track circuit as now commonly used, is retained; and the operating characteristics of the ordinary track circuit are supplemented by the impulse effect caused by a sudden application of a wheel shunt. In other words, the track circuit of this invention will operate the same as does the ordinary track circuit, and will produce the same degree of protection under varying ballast conditions and the like as is now obtained; and in addition to these ordinary operating characteristics, this invention adds the operation of the secondary relay SR by an impulse voltage of self-induction, and positive de-energization of the track relay by completely opening its circuit.

The specific embodiment of the invention illustrated and described, and the foregoing discussion of the principles and mode of operation, are merely typical or representative of the invention; and various adaptations, modifications, and additions may be made without departing from the invention.

What we claim is:

1. In a track circuit for railroads, in combination with a single winding track relay of the direct current type connected across the track rails, a circuit connected across the track relay, control means in said circuit and responsive to the voltage impulse of self-induction generated by said relay upon the sudden application of a wheel shunt and reduction of energizing current of said relay to open completely the electrical connections conducting current to said relay.

2. In a track circuit for railroads, in combination with a direct current track relay, a secondary relay energized in multiple with said track relay and having a magnetic circuit incapable of storing as much energy as can said track relay, said secondary relay having a front contact included in the circuit connections conducting current to said track relay, whereby a decrease in the energizing current of said track relay upon the application of a wheel shunt induces a voltage tending to deenergize said secondary relay and positively open the energizing circuit for said track relay.

3. A track circuit for railroads comprising, in combination with the usual source of current and limiting resistance, a primary relay and a secondary relay each connected across the track rails in series with a resistance, the primary relay being more inductive than the secondary relay, and means controlled by the secondary relay for opening the energizing circuit of the primary relay.

4. In a track circuit for railroads, a quick acting relatively low inductance secondary relay having but one front contact and connected across the track rails, a primary track relay of the direct current type and of relatively high inductance connected across the track rails in multiple with said secondary relay and in series with the front contact of the secondary relay.

5. In a track circuit for railroads, a quick acting relatively low inductance secondary relay having a front and back contact and connected across the track rails, a primary track relay of the tractive armature type and of relatively high inductance connected across the track rails in multiple with said secondary relay and in series with said one front contact, and a shunt around the primary relay including said back contact of the secondary relay and an adjustable resistance.

6. In a track circuit for railroads, a quick acting relatively low inductance secondary relay having a front and a back contact and connected across the track rails, a primary track relay of the tractive armature type and of relatively high inductance connected across the track rails in multiple with said secondary relay and in series with said one front contact, a shunt around the primary relay including said back contact of the secondary relay and an adjustable resistance, and an adjustable resistance connected in series with the two said relays, and between the two said relays and a track rail.

NEIL D. PRESTON.
OSCAR S. FIELD.